United States Patent [19]

Carlisle

[11] Patent Number: 5,234,612

[45] Date of Patent: Aug. 10, 1993

[54] PROCESS FOR THE PRODUCTION OF ESTER DERIVATIVES USEFUL AS FUELS AND LUBRICATING OIL ADDITIVES AND NOVEL ESTERS PRODUCED THEREBY

[75] Inventor: William D. Carlisle, Hull, England

[73] Assignee: BP Chemicals (Additives) Limited, London, England

[21] Appl. No.: 777,217

[22] PCT Filed: Mar. 28, 1991

[86] PCT No.: PCT/GB91/00499

§ 371 Date: Nov. 5, 1991

§ 102(e) Date: Nov. 5, 1991

[87] PCT Pub. No.: WO91/15535

PCT Pub. Date: Oct. 17, 1991

[30] Foreign Application Priority Data

Mar. 31, 1990 [GB] United Kingdom ............... 9007338

[51] Int. Cl.$^5$ ............... C10M 149/12; C07C 101/02
[52] U.S. Cl. ............ 252/51.5 R; 252/51.5 A; 560/155; 560/169; 560/171; 44/391; 44/399; 44/400

[58] Field of Search ............ 44/391, 399, 400; 560/155, 169; 252/51.5 A, 51.5 R

[56] References Cited

U.S. PATENT DOCUMENTS

| 3,091,521 | 5/1963 | Liao | 44/399 |
| 3,594,171 | 7/1971 | Kimura et al. | 560/155 |
| 3,702,339 | 11/1972 | Eck et al. | 560/155 |
| 3,926,578 | 12/1975 | Cummings | 44/399 |
| 4,198,306 | 4/1980 | Lewis | 560/155 |
| 4,210,425 | 7/1980 | Cummings | 44/399 |
| 4,240,804 | 12/1980 | Shields | 44/399 |
| 5,055,588 | 10/1991 | Takase et al. | 560/155 |

Primary Examiner—Ellen Mc Avoy
Attorney, Agent, or Firm—Brooks, Haidt, Haffner & Delahunty

[57] ABSTRACT

Ester derivatives useful as fuels and lubricating oil additives are prepared by the Michael addition of an alkyl acrylate to an amine to produce an intermediate ester, followed by an ester interchange with the intermediate ester to produce the final ester derivatives, some of which are novel compounds.

22 Claims, No Drawings

PROCESS FOR THE PRODUCTION OF ESTER DERIVATIVES USEFUL AS FUELS AND LUBRICATING OIL ADDITIVES AND NOVEL ESTERS PRODUCED THEREBY

The invention relates to a process for the production of ester derivatives useful as fuels and lubricating oil additives and to novel esters produced thereby.

Many ester derivatives useful in particular as fuels additives and processes for their preparation are known from, for example U.S. Pat. Nos. 4,198,306; 3,926,578; 4,210,425; 4,670,021 and 4,240,804.

U.S. Pat. No. 4,198,306 discloses poly(oxyalkylene)-monoesters consisting of an amine moiety and a hydrocarbyl-poly(oxyalkylene) moiety bonded through an ester linkage, $-O-C(O)-R^1-$, where the oxygen atom is bonded to the poly(oxyalkylene) moiety, and wherein $R^1$ is a $C_1$-$C_{19}$ alkylene radical bonded to a nitrogen atom of said amine moiety. The amino esters are prepared by reacting a hydrocarbyl poly(oxyalkylene) alcohol with either a mono unsaturated monocarboxylic $C_2$-$C_{20}$ acid, or an acid halide, anhydride or ester thereof containing an alpha, beta or gamma, halogen or hydrocarbylsulphonyl substituent, followed in a second step by reaction with an amine.

U.S. Pat. No. 3,926,578 discloses a hydrocarbylamine substituted ester of propionic acid represented by the formula:

$$RR^1NCH_2CH_2COOR^{11}$$

in which R is an aliphatic hydrocarbon radical having from 12 to 22 carbon atoms, $R^1$ is hydrogen or a lower alkyl radical having from 1 to 2 carbon atoms and $R^{11}$ is a hydrocarbon radical having from about 8 to 22 carbon atoms. The ester is prepared by reacting approximately equal mole amounts of an aliphatic amine, acrylic acid and an alcohol or hydroxy compound. Generally the reaction is accomplished in two stages, in the first stage the alcohol and acrylic acid are reacted in the presence of an esterification catalyst to produce an unsaturated ester and in the second stage the unsaturated ester is reacted with a hydrocarbylamine.

U.S. Pat. No. 4,210,425 discloses the reaction product of a glycol polyether or polypropylene glycol represented by the formula:

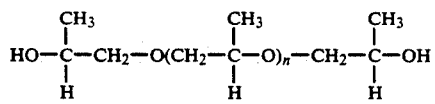

in which n represents a number from about 10 to 90 with an acrylic acid, represented by the formula:

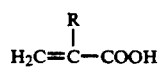

in which R is hydrogen or a methyl radical, and an amine represented by the formula:

$$RNHR^1$$

in which R is a monovalent hydrocarbon radical having from about 4 to 30 carbon atoms or a radical selected from the group represented by the formulas:

$$-(CH_2-CH_2NH)_x-H \text{ or}$$

$$-(CH_2-CH_2-CH_2-NH)_y-H$$

in which x and y are integers from 1 to 6 and $R^1$ is hydrogen or a monovalent hydrocarbon radical having from 1 to 8 carbon atoms. The reaction is accomplished in two steps, in the first step the glycol is reacted with an acrylic acid to form an intermediate unsaturated ester, which is reacted in a second step with the amine.

U.S. Pat. No. 4,670,021 discloses compounds of the formula:

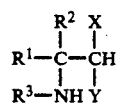

wherein
$R^1$, $R^2$=H, 8-20C hydrocarbyl or 8-20C alkoxy substituted hydrocarbon group;
$R^3$ = 8-12C hydrocarbon group or hydrocarbylamine radical of molecular weight 135-300; X,Y=H, COOH, CN, $CONR^4R^5$, $COR^6$, $COOR^7$, phenyl or $NO_2$; and
$R^4$-$R^7$=H or 1-20C hydrocarbyl.

The preparation of the compound:

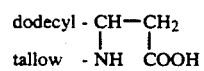

involves a Knoevenagel reaction of dodecylaldehyde with malonic acid followed by Michael addition of tallow amine.

Finally, U.S. Pat. No. 4,240,804 discloses the reaction product of a polyamine (including diamine), or oxygen-containing polyamine, preferably an ether polyamine, and an alkyl ester of acrylic or alkyl acrylic acid.

The majority of the aforesaid processes for producing an ester derivative involve reacting an unsaturated monocarboxylic acid in the presence of an esterification catalyst and under esterification conditions with a hydroxylic compound to produce an ester in which the olefinic unsaturation is retained and thereafter reacting the ester with an amine. A problem with this approach to producing the ester derivatives is that conditions which favour esterification are conducive also to polymerisation of the olefinic double bond of the reactant acid or ester product. One solution to the problem of polymerisation is to add polymerisation inhibititors or suppressants, but these can contaminate the final product. We have found that the polymerisation problem can be avoided by removing the double bond in a facile first stage reaction, which does not require a catalyst or inhibitors, to form a stable intermediate, which can then be further reacted to produce the ester derivative.

Accordingly, the present invention provides a process for the production of an ester derivative, useful as a fuel or lubricating oil additive, the ester derivative having the formula:

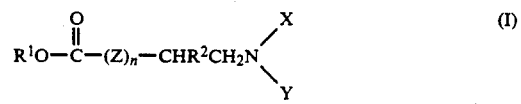

(I)

wherein

R[1] is either a polyoxyalkyleneglycolyl group having at least 18 carbon atoms or either an unsubstituted or an amine-substituted alkyl or alkenyl group having at least 18 carbon atoms, R[2] is either hydrogen or a $C_1$ to $C_6$ alkyl group, n is either zero or is equal to one when Z is a carbonyl-containing group capable of activating an adjacent double bond, X is either hydrogen, an unsubstituted or amine-substituted alkyl group, a polyamine group, or polyalkylene polyamine group, a heterocyclic group, a carboxy group and/or an alkoxy carbonyl group, or X is a group of the formula (II):

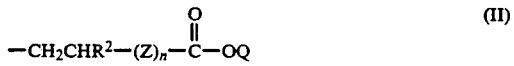

wherein in the formula (II) R[2], Z and n are as defined for formula (I) and Q is either the group R[1] or the group R[3] in which R[3] is $C_1$ to $C_4$ alkyl, Y is either hydrogen or an unsubstituted or an amine-substituted alkyl group, a polyamine group, a polyalkylene polyamine group or a heterocyclic group, or N, X and Y together form a mono- or polycyclic ring system; which process comprises reacting, in a first step, a compound of the formula (III):

HNXY           (III)

wherein X and Y are as defined in relation to the formula (I), with a compound of the formula (IV):

wherein R[2], R[3], Z and n are as defined in the formulae (I) and (II), to give an ester compound of the formula (V):

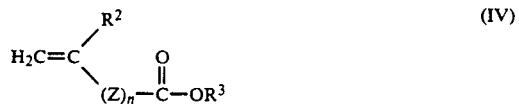

wherein X, Y, R[2], R[3], Z and n are as defined in relation to the formulae (I) and (II), and in a second step reacting the ester compound of formula (V) with a compound of the formula (VI):

R[1]OH           (VI)

ps wherein R[1] is as defined for the formula (I).

The first step of the process involves the Michael addition of an alkyl acrylate to an amine to give a compound of the formula (V). The reaction is facile and can proceed quantitatively at ambient temperature in the absence of a catalyst. The reaction is preferably operated at a temperature in the range from 0° to 100° C., preferably from 20° to 65° C. Suitably, atmospheric pressure is used.

It is an advantage of the present invention that the intermediate ester of formula (V) is stable, being substantially free from polymerisable olefinic double bonds, and can be stored for considerable periods without the need to add polymerisation inhibitors.

The second step involves the reaction of the intermediate ester with a compound of the formula (VI). This is an ester interchange reaction. The reaction may be operated in the presence or absence of a solvent, preferably in the presence of a solvent. Suitable solvents include liquid hydrocarbon solvents, for example xylene.

As regards the reaction conditions, the second step may suitably be operated at a temperature in the range from 50° to 200° C., preferably from 110° to 160° C. and the pressure may be either atmospheric or subatmospheric.

The second step is preferably catalysed. Suitable catalysts for the second step include strong organic bases, inorganic bases and titanium alkoxides.

A preferred strong organic base is an amidine. By the term "amidine" is meant a compound containing the grouping:

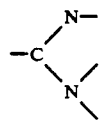

wherein the free valencies on the nitrogen atoms are attached to either carbon atoms or hydrogen and the free valency on the carbon atom is attached to either another carbon atom or nitrogen. In the case that the free valency on the nitrogen is attached to nitrogen the amidine is a guanidine.

A preferred class of amidine is the cyclic amidines. Cyclic amidines are defined as those amidines wherein at least one of the nitrogen atoms is part of an alicyclic or heterocyclic substituted or unsubstituted hydrocarbyl ring. In the case where the amidine is a guanidine then any two of the three nitrogen atoms may be in the same or different rings. Those nitrogen atoms which are not part of any said ring may form of a substituted or unsubstituted hydrocarbyl group.

A preferred class of cyclic amidine is that in which the amidine group can form part of a fused ring system containing 6 and 5 membered rings or 6 and 7 membered rings or two 6 membered rings, as for example in 1,5-diazabicyclo [4.3.0] non-5-ene (DBN) which has the formula:

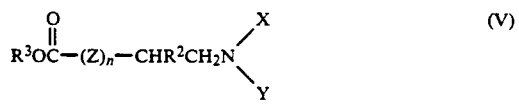

or 1,8-diazabicyclo [5.4.0] undec-7-ene (DUB) of the formula

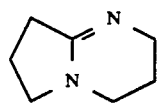

or 1,5,7-triazabicyclo [4.4.0 dec-5-ene (TBD) of the formula

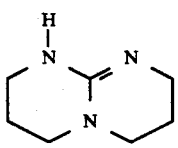

The amidine may be supported on a suitable support. This may be accomplished by deposition of the amidine on a support or by chemical bonding of the amidine to a suitable support. Suitable supported amidine catalysts are described in, for example, European patent application Ser. No. 168167.

As an alternative to an amidine, the strong base may comprise a Lewis base. The term "Lewis base" is generally understood to mean a compound containing an unshared pair of electrons capable of sharing with an acid. The terms "Lewis base" and "amidine" are not therefore mutually exclusive. The Lewis base may suitably be an organic compound containing trivalent nitrogen or phosphorus, for example an amine or a phosphine.

Alternatively, the second step may be catalysed by an inorganic base. Suitable inorganic bases include alkali metal hydroxides and alkoxides. Examples of suitable inorganic bases include sodium methoxide and lithium hydroxide.

Alternatively, the second step may be catalysed by a titanium alkoxide, for example titanium (IV) isopropoxide.

Preferred catalysts for use in the second step are the inorganic bases because of their general availability, relative cheapness and ease of removal from the product by, for example, aqueous washing, leaving substantially no contamination.

Either or both steps of the process may be operated either batchwise or continuously, preferably continuously.

As regards the reactants, the compound of formula (II) may be either ammonia (X=Y=H), a primary amine (either of X or Y=H) or a secondary amine (neither of X or Y=H). Preferably the compound of formula (III) is either a primary amine, in which case in the product ester of formula (I) either X or Y can be a group of the formula (II), i.e. the product is a bis- ester, or a secondary amine in which case the product is a mono-ester. The amine of formula (III) may be either a monoamine or a polyamine (which term includes diamines and polyalkylene polyamines). The alkylene group of the polyalkylene polyamine preferably contains from 2 to 6 carbon atoms, there being suitably 2 to 3 carbon atoms between the nitrogen atoms. Such alkylene groups are exemplified by ethylene, 1,2-propylene, 2,2-dimethyl-propylene, etc. Examples of suitable polyamines include ethylene diamine diethylene triamine, dipropylene triamine, triethylene tetramine etc.

When X and/or Y is alkyl, it is preferably a $C_1$ to $C_4$ alkyl group, for example methyl or ethyl. An example of a suitable amine-substituted alkyl group is 2-amino ethyl.

N, X and Y can together form a mono- or polycyclic ring system, suitably mono- or polycyclic 5- and 6-membered ring systems. Such compounds are exemplified by piperazines, such as 2-methylpiperazine, 1,2-bis-(N-piperazinyl)ethane, 2-methylimidazoline, 3-aminopiperidine, 2-aminopyridine, 1,5,7-triazabicyclo [4.4.0]dec-5-ene, and the like.

As regards the compound of formula (IV), $R^2$ is either hydrogen or a $C_1$ to $C_6$ alkyl group, for example either methyl or ethyl, $R^3$ is $C_1$ to $C_4$ alkyl, for example methyl or ethyl, and Z is a carbonyl-containing group capable of activating an adjacent double bond. Preferably Z is a group of the formula (VII):

wherein in the formula (VII) $R^4$ is a hydrocarbyl group, preferably an alkyl group, more preferably a $C_1$ to $C_6$ alkyl group, for example methyl.

Examples of compounds having the formula (IV) useful in the first step of the process include, when n=0, methyl acrylate and methyl methacrylate and, when n=1, methyl acrylamido-2-methoxyacetate.

Turning now to the compound of the formula (VI), when $R^1$ is alkyl or alkenyl, it is preferably a group with a molecular weight in the range from 250 to 5000, for example from 250 to 2000. Suitable groups are stearyl, oleyl, polyisobutyl or polyisobutenyl (for example that with a number average molecular weight of about 1300) optionally substituted with an amino group, for example $-NHCH_2CH_2NHCH_2CH_2NH_2$.

Alternatively, $R^1$ is a polyoxyalkyleneglycolyl group having at least 18 carbon atoms. The polyoxyalkylene polymers from which the polyoxyalkyleneglycolyl group is derived are monohydroxy compounds, i.e. alcohols, often termed monohydroxy polyethers, or polyalkylene glycol monohydrocarbylethers, or "capped" poly(oxyalkylene) glycols and are to be the distinguished from the poly(oxyalkylene) glycols (diols), or polyols, which are not "capped". "Capped" polyoxyalkylene glycols (PAGs) useful in the performance of the present invention can be prepared by the reaction of a hydroxylic compound, which may be either an alcohol or a phenol or an amine with either (i) at least one alkylene oxide containing from 2 to 5 carbon atoms, for example ethylene oxide, propylene oxide or butylene oxide, or (ii) at least one olefin oxide containing at least 6 carbon atoms, or (iii) a mixture of (i) and (ii), and may suitably have a molecular weight in the range from 500 to 10,000, preferably from 1200 to 5000. PAGs are more fully described in U.S. Pat. No. 4,236,020, the disclosure of which in respect of suitable PAGs is incorporated by reference herein. PAGs may be homopolymers or copolymers. Copolymer PAGs may be random copolymers, block copolymers or tapered copolymers. The PAG desirably should contain sufficient oxyalkylene units other than oxyethylene to effect solubility in internal combustion engine fuels. Particularly suitable PAGs for use in the process of the present invention include:

(i) the PAG obtained by the reaction of a dodecylphenol, preferably p-dodecylphenol, with butylene oxide and having a molecular weight of about 2,000, which material is commercially available as BREOX (RTM) PC1362 from Hythe Chemicals Limited, (ii) the PAG obtained by reacting a dodecylphenol, preferably a p-dodecylphenol, with propylene oxide, (iii) the PAG obtained by reacting an alkylphenol with propylene oxide to produce a polypropylene oxide block and thereafter with a $C_{14}$ alkyl-substituted ethylene oxide of the formula:

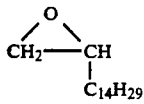

to produce a block of poly- $C_{14}$ alkyl-substituted ethylene oxide, (iv) the random, block or tapered copolymer obtained by reacting a starter molecule having the formula:

$$RX(R^1)_q$$

wherein

R is either an alkyl or alkaryl group having from 1 to 30 carbon atoms, $R^1$ is independently either H, or $C_1$ to $C_{20}$ alkyl, X is O, S or N, and q is either 1 or 2 depending upon the valency of X; with an alkylene oxide having 2 to 4 carbon atoms, e.g. propylene oxide, and an olefin oxide having at least 5 carbon atoms, preferably from 12 to 16 carbon atoms, for example 1,2-epoxydecane or 1,2-epoxyhexadecane, as described for example in EP-A-0355977.

(v) the PAG produced by the hydroxyalkylation, suitably by reaction with at least one alkylene oxide, of amines, for example ethylene diamine or N-(3-aminopropyl)morpholine.

In another aspect, the present invention provides an internal combustion engine fuel concentrate composition comprising as a first component from 1 to 95% by weight of a compound of the formula (I) as produced by the process as hereinbefore described and as a second component a fuel compatible solvent therefor.

The fuel compatible solvent for the compound of the formula (I) may suitably be an internal combustion engine fuel.

In yet another aspect, the invention provides an internal combustion engine fuel composition comprising a major proportion of an internal combustion engine fuel and a minor proportion of the concentrate composition of the invention.

The amount of the concentrate composition present in the fuel composition may suitably be such as to provide a concentration of the compound of formula (I) in the fuel composition in the range from 10 to 10,000 p.p.m. by weight.

The internal combustion engine fuel is preferably a fuel boiling in the gasoline range. The fuel composition may incorporate additives conventionally employed in fuel compositions. Such additives may be incorporated either into the fuel concentrate or directly into the fue composition.

The invention also provides a lubricating oil composition comprising a major proportion of an oil of lubricating viscosity and a minor proportion of the ester derivative of formula (I) as produced by the process as hereinbefore described.

The oil of lubricating viscosity may be an animal, vegetable or mineral oil. Suitably the lubricating oil may be a petroleum-derived lubricating oil, such as a naphthenic base, paraffin base or mixed base oil. Alternatively, the lubricating oil may be a synthetic lubricating oil. Suitable synthetic lubricating oils include synthetic ester lubricating oils, which oils include diesters such as di-octyl adipate, di-octyl sebacate and tri-decyladipate, or polymeric hydrocarbon lubricating oils, for example liquid polyisobutenes and poly-alpha olefins.

The composition may be used for any lubricating application, including automotive and marine use.

For both automotive and marine uses the composition may suitably incorporate up to 10% by weight of the ester derivative of the formula (I).

The composition may further incorporate any of the additives conventionally employed in lubricating oil compositions.

Many of the ester derivatives encompassed by the formula (I) are novel compounds. The present invention also provides novel compounds as follows:

(A) Compounds having the formula (I) wherein n=1, Z is a carbonyl-containing group capable of activating an adjacent double bond, preferably a group of the formula (VII), and $R^1$, $R^2$, X and Y are as defined in relation to the formula (I);

(B) Compounds having the formula (I) wherein n=O, X is a group of the formula (II) and $R^1$, $R^2$ and Y are as defined in relation to the formula (I);

(C) Compounds having the formula (I) wherein n=O, $R^1$ is either an unsubstituted or amine-substituted alkyl or alkenyl group having greater than 30 carbon atoms, preferably an unsubstituted or amine-substituted polyisobutene or polyisobutenyl group, and $R^2$, X and Y are as defined in relation to the formula (I): and (D) Compounds having the formula (I), wherein n=O, $R^1$ is a polyoxyalkyleneglycolyl group derived from a "capped" polyoxyalkylene glycol comprising either (i) units of at least one olefin oxide containing at least 6 carbon atoms, or (ii) units of at least one alkylene oxide containing from 2 to 5 carbon atoms and units of at least one olefin oxide containing at least 6 carbon atoms and $R^2$, X and Y are as defined in relation to the formula (I).

The invention will now be further illustrated by reference to the following Examples.

Example 1: Mono Michael adduct of N-methyl piperazine and methyl acrylate

Methyl acrylate (1 mol) was added dropwise to N-methylpiperazine (1 mol) with no external cooling of the exothermic reaction. The addition was complete after 90 minutes, during which time the temperature rose from 19° C. to 65° C. It was stirred for a further 24 hours at ambient temperature, at the end of which time the temperature had returned to 19° C. The nature of the product was confirmed using infrared spectroscopy, $^1H$ and $^{13}C$ nmr, and by its nitrogen content (Expected: total N=basic N=15.0%: Found total N=15.2%, basic N=14.8%).

Example 2: Mono Michael addition of methyl acrylate to N,N-dimethylamino-propylamine Methyl acrylate (0.2 mol.) was added dropwise to N,N-dimethyl-3-amino-propylamine (0.2 mol.) over 2 hours with no external cooling of the mildly exothermic reaction. The mixture was stirred for one hour at ambient temperature, when $^1H/^{13}C$ NMR and infrared spectroscopy indicated the reaction to be complete. Example 3: Bis Michael addition of methyl acrylate to N,N-dimethylamino-propylamine Methyl acrylate (0 2 mol.) was added dropwise to a solution of N,N-dimethyl-3-aminopropylamine (0.1 mol.) in methanol (20ml) over 2 hours at ambient temperature. The reaction was stirred at reflux temperature for 18 hours. $^1$H nmr indicated the reaction to be complete. The solvent was stripped in vacuo and the product analysed using $^1$H/$^{13}$C nmr and infrared spectroscopy.

Example 4: Mono Michael addition of methyl methacrylate to N,N-dimethyl-aminopropylamine Methyl methacrylate (0.15 mol.) was added dropwise to a solution of N,N-dimethyl-3-aminopropylamine (0.15 mol.) in methanol (15 ml) over 30 minutes at ambient temperature. The reaction was stirred at reflux temperature for 20 hours. $^1$H nmr indicated the reaction to be complete. The solvent was stripped in vacuo and the product analysed using $^1$H/$^{13}$C nmr and infrared spectroscopy.

Example 5: Mono adduct of N-methyl piperazine and methyl acrylamido-2-methoxyacetate (MAMA)

N-Methyl piperazine (0.5 mol.) was added dropwise to a solution of MAMA (0.5 mol.) in methanol (80 ml) over 4 hours. During this time the temperature of the solution rose from 14° C. to 32° C. without any external heating. On completion of the addition the solution was stirred at ambient temperature for 24 hours. The product was obtained by removal of the methanol in vacuo. The nature of the adduct was confirmed using nitrogen analysis (Expected = 15.4%; found = 15.4%) and $^1$H/$^{13}$C nmr spectroscopy.

Example 6: Transesterification of the Michael adduct of methyl acrylate and N-methyl piperazine (product of Example 1) with polyether A The aminoester (0.05 mol) prepared above and polyether A [mw 1966, prepared by the reaction of p-dodecylphenol (1 mol) with butylene oxide (25 mol)] (0.07 mol) were heated in xylene (300 ml) at reflux temperature in the presence of a sodium methoxide catalyst (0.009 mol). The reaction was monitored by collection of the methanol by-product. It was complete after 1 hour when the theoretical amount of methanol (0.059 mol) had been distilled from the reaction mixture. The excess polyether present that had been converted to its alkoxide salt was reconverted to alcohol on cooling by the addition of water (0.03 mol). The sodium hydroxide generated, and the excess water present, were removed by the addition of anhydrous magnesium sulphate and subsequent filtration of the mixture. The solvent was stripped from the filtrate to leave the product as a clear pale yellow liquid. The total and basic nitrogen contents were both 0.72%. The chloride content in the product was less than 20 ppm (detector limit).

Example 7: Transesterification of the Michael adduct of methyl acrylate and N-methyl piperazine (product of example 1) with the polyether B The Michael adduct of methyl acrylate and N-methyl piperazine (0.1 mol) from Example 1 and polyether B [mw 900, prepared by the reaction of p-dodecylphenol (1 mol) with propylene oxide (11 mol)] (0.2 mol) were heated in o-xylene (275 ml) to reflux temperature in the presence of a sodium methoxide catalyst (0.03 mol) over 3 hours. The head temperature at the point of distillate collection rose to 64° C. The temperature remained steady while the theoretical amount of methanol was collected over 2 hours. The reaction was allowed to cool to ambient temperature. Distilled water (0.1 mol.) was added and the solution stirred for 10 minutes. The excess water was dried with anhydrous magnesium sulphate (20 g) and the inorganic salts removed by filtration through hyflo. The o-xylene was stripped from the pale yellow filtrate to leave the product a clear yellow oil. The total nitrogen content was 1.1% and the basic nitrogen content was 1.0%.

Example 8: Transesterification of the Michael adduct of methyl acrylate and N-methyl piperazine (product of example 1) with the polyether C The Michael adduct of methyl acrylate and N-methyl piperazine (1) from Example 1 and polyether C [mw 2,000, prepared by the reaction of dinonylphenol (1 mol) with propylene oxide (30 mol) and the epoxide of a $C_{16}$ alpha olefin (1.3 mol)] (0.11 mol) were heated in o-xylene (300 ml) to reflux temperature in the presence of a sodium methoxide catalyst (0.02 mol) over 3 hours. The head temperature at the point of distillate collection rose to 64° C. The temperature remained steady while the theoretical amount of methanol was collected over 2 hrs The reaction was allowed to cool to ambient temperature. Distilled water (0.06 mol.) was added and the solution stirred for 10 minutes. The excess water was dried with anhydrous magnesium sulphate (20g) and the inorganic salts removed by filtration through hyflo. The o-xylene was stripped from the pale yellow filtrate to leave the product as clear yellow oil. The total nitrogen content was 0.72% and the basic nitrogen content was 0.72%. The chloride content in the product was less than 20ppm (detector limit).

Example 9: Transesterification of the Bis Michael adduct of methyl acrylate and N,N-dimethylaminopropylamine (product of example 3) with polyether B The Bis Michael adduct of methyl acrylate and N,N-dimethylamino-propylamine (0.1 mol) and the polyether B (0.3 mol) were heated in o-xylene (320 g) to reflux temperature in the presence of a sodium methoxide catalyst (0.04 mol). The reaction was monitored by collection of the methanol by-product. The mono-transesterification was complete after 50 minutes. Distilled water (0.06 mol.) was added and the solution stirred for 10 minutes. The excess water was dried with anhydrous magnesium sulphate (20 g) and the inorganic salts removed by filtration through hyflo. The o-xylene was stripped from the pale yellow filtrate to obtain the product.

ENGINE TEST RESULTS: OPEL KADETT

Typical valve deposit wt for untreated gasoline = 300–400 mg.

| PACKAGE TREATMENT LEVEL IN THE GASOLINE = 1000 PPM WT | | |
| --- | --- | --- |
| Package 1: | Example 7 | 15% |
| | ADX250 | 15% |
| | Synthethic carrier | 40% |
| | Solvent | 30% |
| | Average valve deposit Wt (mg) = | 21.0 |
| Package 2: | Example 7 | 30% |
| | Synthetic carrier | 40% |
| | Solvent | 30% |
| | Average valve deposit Wt (mg) = | 42.0 |
| Package 3: | Example 8 | 30% |
| | ADX250 | 15% |
| | Synthetic carrier | 25% |
| | Solvent | 30% |
| | Average valve deposit Wt (mg) = | 86.5 |

| PACKAGE TREATMENT LEVEL IN THE GASOLINE = 500 PPM Wt | | |
|---|---|---|
| Package 4: | Example 6 | 50% |
| | Solvent | 50% |
| | Average valve deposit Wt (mg) = | 63.0 |

Note:
ADX250 is a commercially available aminated polyisobutene marketed by Adibis.

I claim:

1. A process for the production of an ester derivative, useful as a fuel or lubricating oil additive, the ester derivative having the formula (I):

$$R^1O-\overset{O}{\underset{\|}{C}}-(Z)_n-CHR^2CH_2N\diagup^X_Y \quad (I)$$

wherein
$R^1$ is either a polyoxyalkylene glycolyl group having at least 18 carbon atoms or either an unsubstituted or an amine-substituted alkyl or alkenyl group having at least 18 carbon atoms,
$R^2$ is either hydrogen or a $C_1$ to $C_6$ alkyl group,
n is either zero or is equal to one when Z is a carbonyl-containing group capable of activating an adjacent double bond,
X is either hydrogen, an unsubstituted or amine-substituted alkyl group, a polyamine group, a polyalkylene polyamine group, a heterocyclic group, a carboxy group and/ or an alkoxy carbonyl group, or X is a group of the formula (II):

$$-CH_2CHR^2-(Z)_n-\overset{O}{\underset{\|}{C}}-OQ \quad (II)$$

wherein
in the formula (II) $R^1$, $R^2$, Z and n are as defined for formula (I) and Q is either the group $R^1$ or the group $R^3$ in which $R^3$ is $C_1$ to $C_4$ alkyl,
Y is either hydrogen or an unsubstituted or an amine-substituted alkyl group, a polyamine group, a polyalkylene polyamine group or a heterocyclic group, or
N, X and Y together form a mono- or polycyclic ring system; which process comprises reacting, in a first step, a compound of the formula (III):

HNXY  (III)

wherein X and Y are as defined in relation to the formula (I), with a compound of the formula (IV):

$$H_2C=C\diagup^{R^2}_{(Z)_n-\overset{O}{\underset{\|}{C}}-OR^3} \quad (IV)$$

wherein $R^2$, $R^3$, Z and n are as defined in the formulae (I) and (II), to give an ester compound of the formula (V):

$$R^3O-\overset{O}{\underset{\|}{C}}-(Z)_n-CHR^2CH_2N\diagup^X_Y \quad (V)$$

wherein X, Y, $R^2$, $R^3$, Z and n are as defined in relation to the formula (I) and (II), and in a second step reacting the ester compound of formula (V) with a compound of formula (VI):

$R^1OH$  (VI)

wherein $R^1$ is as defined for the formula (I).

2. A process according to claim 1 wherein the first step is carried out in the absence of a catalyst.

3. A process according to claim 2 wherein the first step is carried out in the presence of a solvent which is methanol.

4. A process according to claim 1 wherein the first step is carried out at a temperature in the range from 20° to 65° C.

5. A process according to claim 1 wherein the second step is carried out in the presence of a hydrocarbon solvent.

6. A process according to claim 1 wherein the second step is carried out at a temperature in the range from 110° to 160° C.

7. A process according to claim 1 wherein the second step is catalysed either by a strong organic base, an inorganic base or a titanium alkoxide.

8. A process according to claim 7 wherein the catalyst is an inorganic base which is an alkali metal hydroxide or alkoxide.

9. A process according to claim 1 wherein the compound of formula (III) is either a primary or a secondary amine.

10. A process according to claim 1 wherein in the formula (IV) n=1 and Z is a group of the formula (VII):

$$-\underset{OR^4}{\underset{|}{CH}}-NH-\overset{O}{\underset{\|}{C}}- \quad (VII)$$

11. A process according to claim 1 wherein in the formula (IV) $R^2$ is either hydrogen, methyl or ethyl.

12. A process according to claim 1 wherein the compound of formula (IV) is either methyl acrylate, methyl methacrylate or methylacrylamido-2-methyoxyacetate.

13. A process according to claim 1 wherein the compound of the formula (IV) is a "capped" polyoxyalkylene glycol.

14. A process according claim 1 wherein in the formula (VI) $R^1$ is a polyisobutyl or polyisobutenyl group having a molecular weight in the range from 250 to 5000.

15. A process according to claim 14 wherein the polyisobutyl or polyisobutenyl group is amino-substituted.

16. A lubricating oil composition comprising a major proportion of an oil of lubricating viscosity and a minor proportion of the ester derivative of formula (I) as defined in claim 1 and as produced by the process of claim 1.

17. An ester derivative of the formula (I) as defined in claim 1 wherein n=1, Z is a carbonyl-containing group capable of activating an adjacent double bond and $R^1$, $R^2$ X and Y are as defined in relation to the formula (I).

18. An ester derivative according to claim 17 wherein Z is a group of the formula (VII) as defined in claim 10.

19. An ester derivative of the formula (I) as defined in claim 1 wherein n=O, X is a group of the formula (II) and $R^1$, $R^2$ and Y are as defined in relation to the formula (I).

20. An ester derivative of the formula (I) as defined in claim 1 wherein n=O, $R^1$ is either an unsubstituted or amine-substituted alkyl or alkenyl group having greater than 30 carbon atoms and $R^2$, X and Y are as defined in relation to the formula (I).

21. An ester derivative according to claim 20 wherein $R^1$ is an unsubstituted or amine-substituted polyisobutene or polyisobutenyl group.

22. An ester derivative of the formula (I) as defined in claim 1 wherein n=O, $R^1$ is a polyoxyalkeneglycolyl group derived from a "capped" polyoxyalkyleneglycol comprising either (i) units of at least one olefin oxide containing at least 6 carbon atoms, or (ii) units of at least one alkylene oxide containing from 2 to 5 carbon atoms and units of at least one olefin oxide containing at least 6 carbon atoms and $R^2$, X and Y are as defined in relation to the formula (I).

* * * * *

UNITED STATES PATENT AND TRADEMARK OFFICE
CERTIFICATE OF CORRECTION

PATENT NO. : 5,234,612

DATED : August 10, 1993

INVENTOR(S) : WILLIAM D. CARLISLE

It is certified that error appears in the above-indentified patent and that said Letters Patent is hereby corrected as shown below:

Col. 7, l. 16-17, "X is" should read on a separate line

Col. 7, l. 53, correct the spelling of the word "fue_l_"

Col. 8, l. 29, there should be a semi-colon (;) after (I)

Col. 8, l. 66, should read "(O._2 mol.)"

Col. 9, l. 31, correct the spelling of the word "N-methy_l_"

Col. 10, l. 13, should read "piperazine (.07 mol)"

Col. 10, l. 59, correct the spelling of the word "synthetic"

Claim 1, at col. 11, l. 47, after "alkyl group" insert a comma (,)

Claim 1, at col. 12, l. 3, formula V should read "$R^3O-C-(Z)_n--CHR^2CH_2N{<}^x_y$"

UNITED STATES PATENT AND TRADEMARK OFFICE
CERTIFICATE OF CORRECTION

PATENT NO. : 5,234,612
DATED : August 10, 1993
INVENTOR(S) : WILLIAM D. CARLISLE It is certified that error appears in the above-indentified patent and that said Letters Patent is hereby corrected as shown below:

Claim 14, column 12, line 55, after "according" and before "claim" insert --to--

Signed and Sealed this

Tenth Day of May, 1994

*Attest:*

BRUCE LEHMAN

*Attesting Officer*    *Commissioner of Patents and Trademarks*